June 18, 1935. R. W. WHITTLE ET AL 2,005,514
CHANGE SPEED GEARING
Filed March 16, 1934 6 Sheets-Sheet 1

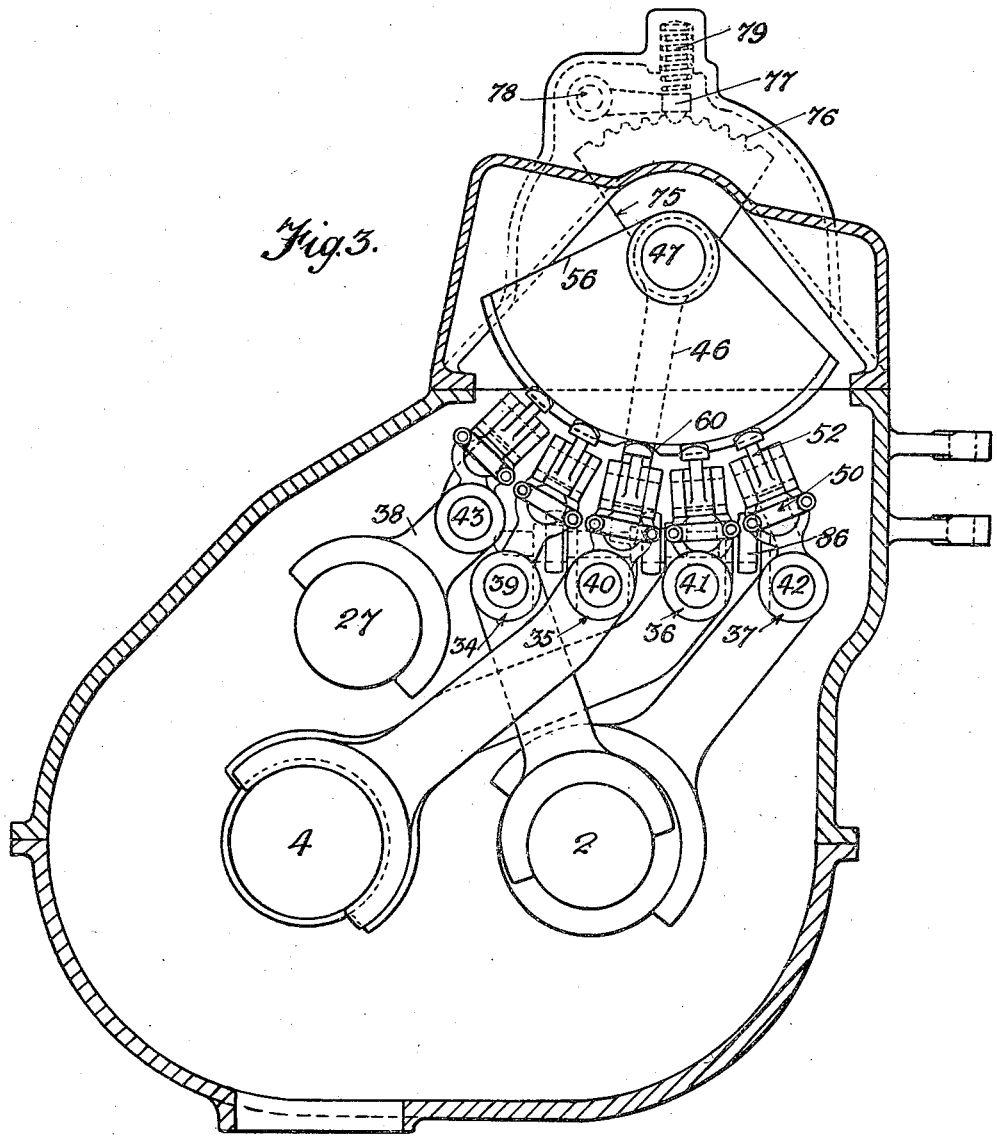

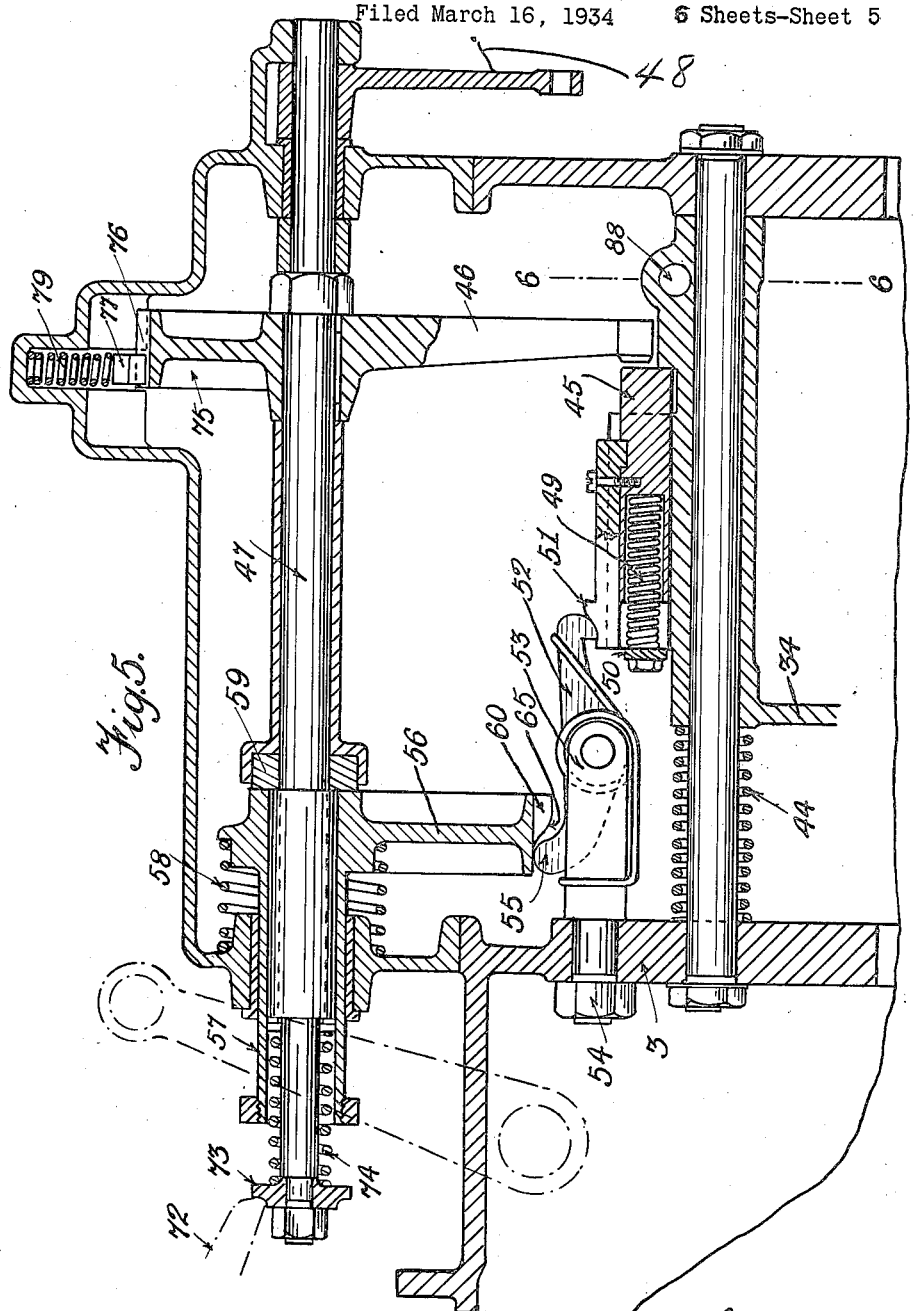

Patented June 18, 1935

2,005,514

UNITED STATES PATENT OFFICE 2,005,514

CHANGE SPEED GEARING

Reginald Wood Whittle, Urmston, and Edwin Twemlow, Sandbach, England

Application March 16, 1934, Serial No. 715,986
In Great Britain March 18, 1933

4 Claims. (Cl. 74—334)

This invention comprises change speed gearing of the pre-selective kind wherein constant mesh gears on a main and lay shafts are adapted to be rendered operable by claw clutches the ends of the teeth of which are inclined in such manner that the teeth cannot be moved into engagement if the speed of the driven element exceeds that of the driving element, and all engaging in one direction. The clutches are actuated by forked levers or the like hereinafter termed dogs, the actuating movement being imparted to a member slidably mounted on each dog by a reciprocating member or tappet on a draw bar capable of being turned to select a dog. A compression spring is interposed between the slidable member and the dog to allow of delayed movement of the clutch due to the inclined ends of the teeth, springs of less strength also being provided normally tending to move the dogs to inoperative position and separate the clutch elements. Means are provided to positively retain the selected clutch in engagement, said means comprising a latch which locks the slidable member in spring loaded position independently of the tappet but which is released by a projection or quadrant on the draw bar capable of engaging the latches during its forward motion, the arrangement being such that said projection or quadrant opens all the latches except the one for the clutch that the tappet is in the act of coupling, said projection or quadrant being formed with a notch in line with the tappet to give clearance for the selected latch.

The clutch elements may be arranged on an arc of a circle concentric with the draw bar, to which motion may be imparted by means of a hand lever or the like moving over a notched plate, calibrated dial or the like having indications thereon by means of which the desired gear is selected, the reversing gear, when incorporated, being controlled by a like clutch interconnected with the remaining clutches to prevent simultaneous engagement of two clutches and actuated by the same tappet in like manner, the draw bar being coupled to and actuated by the usual clutch pedal.

It will now been seen that in the arrangement according to the invention a single movement in one direction will cause the engagement of any of the gear trains as pre-selected and the disconnection of any other of the trains of gearing which may be in operation, while the arrangement is such that none of the trains of gears can be coupled up or rendered operative while the speed of the driving element is less than that of the driven element, the particular speed being pre-selected and the act of rendering the same effective functioning with the engine clutch control.

The invention will be more particularly described by the aid of the accompanying drawings wherein:—

Figure 3 is a cross sectional view of the gear box showing in detail the clutch control mechanism of which Figure 4 is a perspective view with parts broken away for clearness of understanding and Figure 5 is a longitudinal sectional view showing one of such actuating mechanisms in detail, whilst

Figure 1:
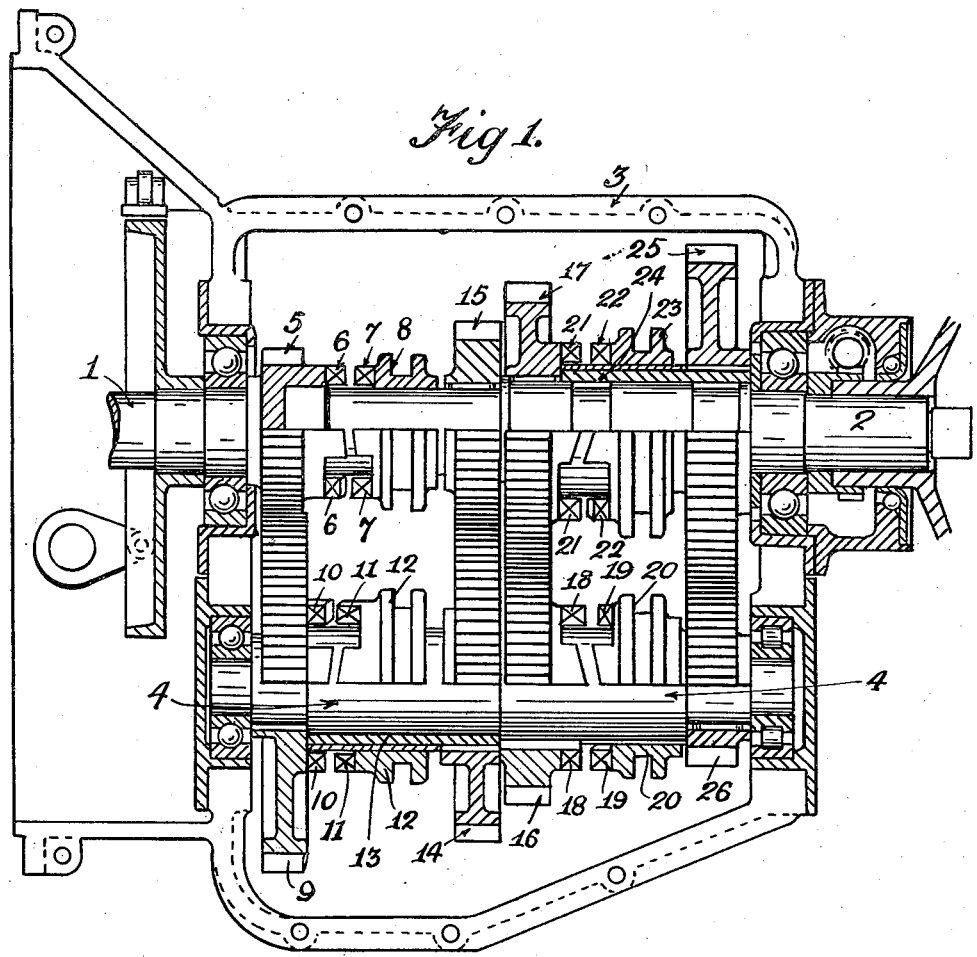
Figure 1 is a sectional plan view of the gear box showing the driving, driven, and lay shaft with the associated gearing and clutches partly in section.
Figure 2:
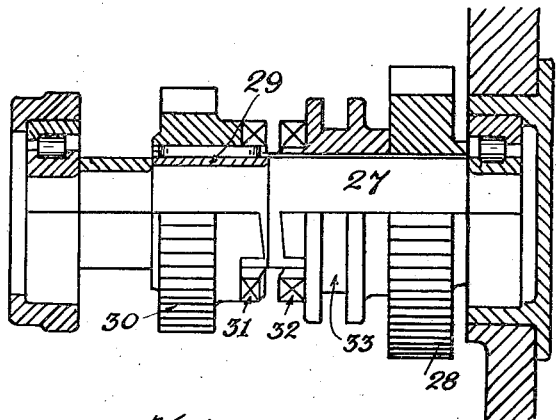
Figure 2 is a detail view of the reverse shaft also partly in section.
Figure 6:
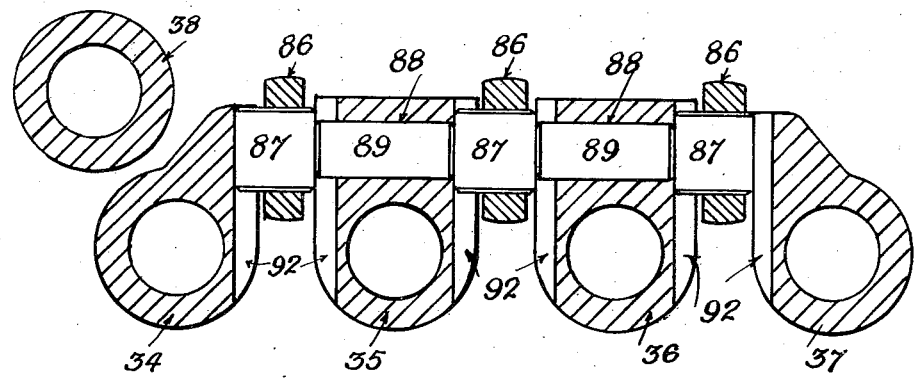
Figure 6 is a sectional view on the line 6, 6, Figure 5 showing in detail the interlocking means.

In carrying the invention into effect according to one convenient manner and as adapted for a four speed and reverse gear for motor vehicles the driving and driven shafts 1 and 2 respectively are aligned in the gear box 3 in which is journaled a lay shaft 4 in parallel relationship. On the end of the driving shaft 1 within the box 3 is a pinion 5 having clutch teeth 6 on its face the outer face of said teeth being inclined with the highest part of each tooth on the leading side, as clearly seen in Figure 1 teeth 7 of like shape being formed on the complemental clutch element 8 slidably mounted on the aligned driven shaft 2 which is splined to receive the same, and which gives the fourth or direct drive.

The driving pinion 5 is permanently in mesh with a pinion 9 keyed to the lay shaft 4 said pinion having clutch teeth 10 thereon of like formation to those previously described to mesh with the teeth 11 of the complemental clutch element 12 which is slidably mounted on a sleeve 13 splined to receive the same and journaled on the lay shaft 4, said sleeve having formed in one therewith or keyed to its opposite end a pinion 14 in constant mesh with a pinion 15 keyed to the driven shaft 2 to constitute the third gear.

A second pinion 16 journaled on the lay shaft 4 is arranged in constant mesh with a second pinion 17 keyed to the driven shaft 2 and is formed with clutch teeth 18 of like kind to those before described adapted to be engaged by the teeth 19 on the complemental clutch element 20 slidably mounted on the lay shaft 4, which is splined to receive the same, appropriate gear ratios being used in this train which constitute the second gear. Said second speed pinion 17 on the driven shaft is provided with clutch teeth 21 shaped as before described adapted to be engaged by the complemental teeth 22 on the clutch element 23 slidably mounted on a sleeve 24 splined to receive the same and journaled on the driven shaft 2 said sleeve having formed in one therewith or keyed to its opposite end a pinion 25 in constant mesh with a pinion 26 keyed to the opposite end of the lay shaft 4 from which the drive is obtained to constitute the first or low gear.

A second lay shaft 27 journaled in the gear case 3 has formed in one therewith or keyed thereto at one end a pinion 28 which is in constant mesh with the first speed pinion 25 on the driven shaft 2 and has a sleeve 29 rotatably mounted thereon having a pinion 30 fixed thereto in constant mesh with the sleeve pinion 16 on the first lay shaft 4 for the second gear said sleeve pinion 30 having clutch teeth 31 on its face adapted to be engaged by the teeth of the complemental teeth 32 on a clutch element 33 which is slidably mounted on said second lay shaft 27 splined to receive the same, the clutch teeth 31, 32, having inclined faces of like formation to all the preceding clutches and by means of which the reverse drive is obtained through the pinions 25, 28, 30, 16 and 17 from the positively driven pinion 26 on the lay shaft 4.

The moving elements 8, 12, 20, 23, and 33 of the clutches are grooved to receive the forked arms of dogs numbered 34, 35, 36, 37 and 38 respectively each slidably mounted on a separate cross guide 39, 40, 41, 42 and 43 respectively in the gear box 3 and as the mounting and actuation of said dogs is the same for all the clutches one only will be described in detail with reference more particularly to Figure 5 which to avoid multiplication of reference numerals will be assumed to illustrate the first or direct drive control.

Each sliding dog comprises a forked arm to engage the moving element of the clutch which is carried by a body part bored to receive the guide, a spring 44 threaded on the guide reacting between the wall of the gear case 3 and the end of the body part tending to move the dog and consequently the respective movable clutch element into the disconnected position. The top of the body part is provided with a member 45 with which, on the side remote from the spring 44, contacts a pendent arm 46 on a fitment hereinafter referred to as the tappet mounted on a draw bar 47 extending transversely through the gear casing said draw bar being provided with a crank arm 48 splined thereon exteriorly of the casing and connected by suitable links and levers (not shown) to a hand lever located at any convenient point in the vehicle, said hand lever moving in a slotted quadrant provided with notches to engage a finger on the lever, or with other means, to indicate the positions for the lever to set the tappet to engage the selected dog or move it to the neutral position. Said tappet 46 is splined on the draw bar 47 so as to move therewith the turning movement of the draw bar serving to move the tappet into register with the desired clutch element to which the axial movement of the draw bar is transmitted to actuate said clutch element in the following manner.

Figure 4:
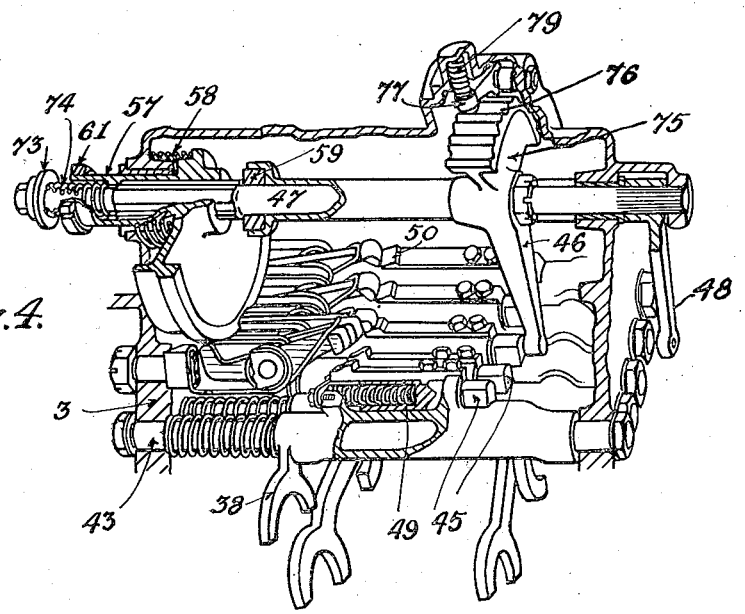
Figure 7:
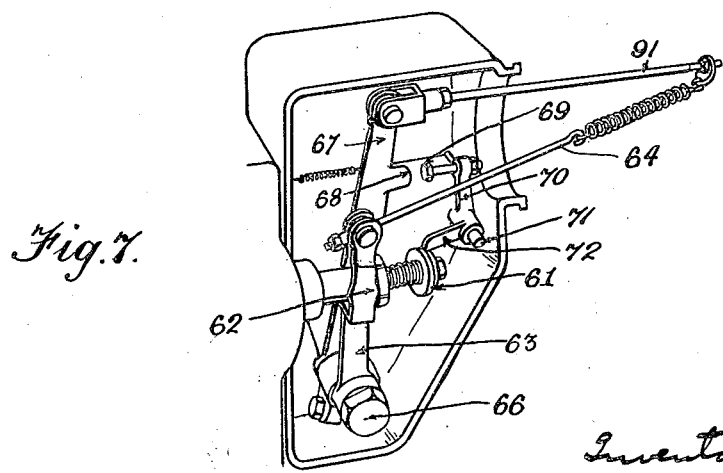
Figure 7 shows in perspective elevation the mechanism for actuating the gearing whilst

The member 45 is slidably mounted on each dog and is normally forced to a rearward position as shown in Figure 4 by means of a spring 49 which is stronger than the spring 44 and reacts against the stop 50 forming part of said dog. Each member 45 has an upstanding projection or catch 51 attached thereto adapted to be engaged by the spring latches 52 pivotally mounted in brackets 53 secured to the inside wall of the gear case 3 by the nut 54, so as to lock the selected gear in the clutch engaged position. Each spring latch 52 is formed with a projection 55, at the other end on the top side, which lies in the path of a quadrant 56 or disc having a tubular body part 57 slidably mounted on the draw bar 47 a spiral spring 58 normally tending to move said quadrant rearwardly into contact with the collar 59 on the draw bar 47 and clear of the projections 55 on the latches 52. The edge of the quadrant 56 is formed with a slot 60 in line with the tappet arm 46 to provide clearance for the projection 55 on the retaining latch 52 for the clutch in operation and so that the same is not influenced by the sliding movement of said quadrant.

The tubular body part 57 is splined on the draw bar 47 and is provided exteriorly of the gear casing with a collar 61 adapted to be engaged by the fork arms 62 on the lever 63 coupled by means of the spring link 64 to the coupling link 91 connected to the clutch pedal not shown so that with the first increment of movement of such pedal the quadrant 56 is drawn forward, against the pressure of the spring 58, so that the inclined ledge 65 formed on the perimeter depresses the rear end of each latch 52 so as to rock the same and release any clutch in operation except the particular clutch the retaining latch 52 for which is in line with the gap 60 in the perimeter of the quadrant.

The lever arm 63 is pivotally mounted on the clutch spindle 66 journaled transversely of the gear casing and on which is mounted the clutch lever 67 coupled to the clutch pedal by means of the link 91 to which the spring link 64 is connected and provided with a projection or tappet 68 adapted, after the quadrant 56 has moved, to trip the latches 52, to contact with the adjustable projection 69 on the arm 70 of a bell crank lever pivotally connected at 71 to the crank casing, the other arm 72 of which normally constitutes a stop adapted to engage the collar 73 on the draw bar 47 and prevent movement of said draw bar until the quadrant 46 has moved forward a sufficient distance to trip all the retaining latches 52 not required as before described. When however, the tappet 68 has rocked the bell crank lever to remove said stop clear of the collar 61 the spring 74 which has been compressed causes the draw bar 47 to move forward carrying with it the tappet 46 and sliding member 45 until the catch 51 engages the respective latch 52. The respective dog and sliding member 45 move as one against the pressure of the spring 44 to couple the respective clutch if the speeds are such that engagement can take place, but if the one clutch element is overrunning the other preventing such engagement the spring 49 allows of forward movement of the member 45 into locking engagement with the respective latch 52 the compression of said spring acting to move the dog and the clutch element forward against the pressure of the spring 44 immediately the relative speeds permit the clutch to function so that no undue stress is placed on the coupling teeth.

The tappet arm 46 is also provided with a quadrant 75 having notches 76 on its periphery to engage a projection on a lever 77 pivotally mounted at 78 and pressed into engagement with said notches by the spring 79 so as to position said fitment correctly for each adjusted position, that is to say, with the tappet arm 46 in line with the respective dog and the peripheral notch 69 of the quadrant 56 in line with and provide clearance for the respective latch 52.

Figure 8:
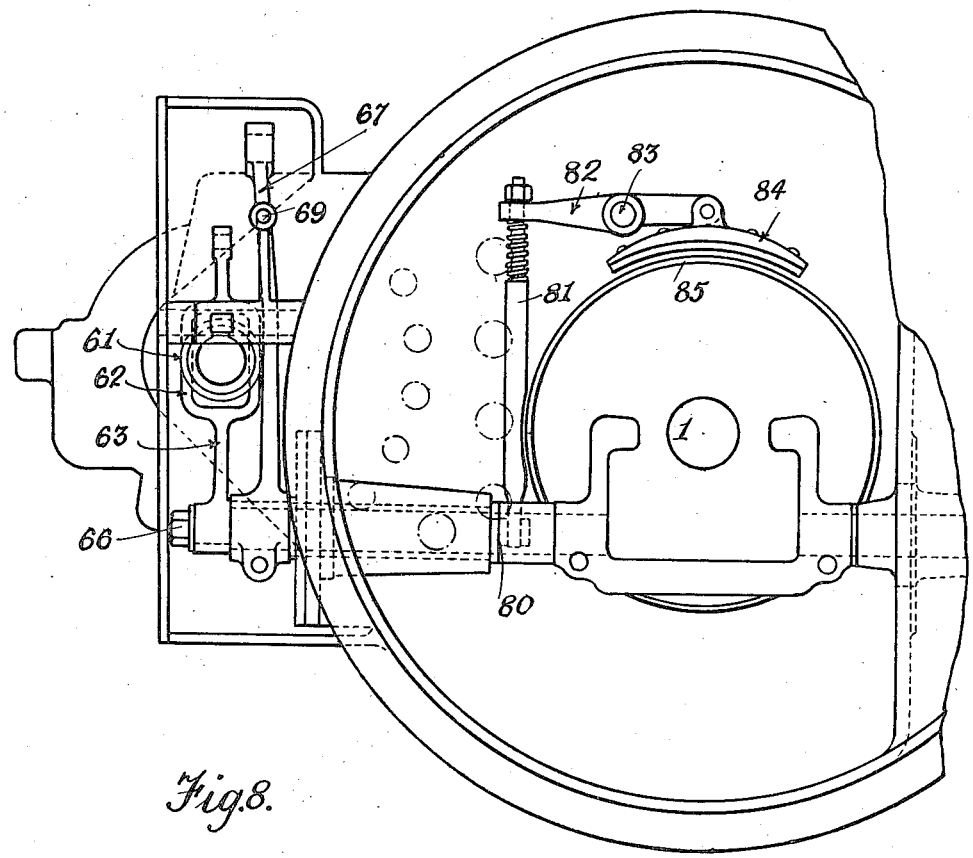
Figure 8 is a detail view showing the braking means.

Mounted on the clutch shaft 66 is a crank arm 80 connected by means of the link 81 see Figure 8 to one end of a lever 82 pivotally connected at 83 to the gear case and having at its other end a brake block 84 bearing on the drum 85 on the driving shaft 1 to more quickly equalize the speeds when the engine is declutched to facilitate engagement of the clutch elements.

Carried in a suitable cage 86 between each adjacent pair of dogs is a roller 87 or ball forming a loose fit in recesses 92 in the adjacent faces of the body parts each of which has a transverse bore 88 connecting the recesses 92 in which is located a sliding pin 89 the overall length of all the pins 89 and rollers 87 being such that the movement of the selected dog forces outwards the rollers or balls normally resting in the recesses formed therein, this movement being transmitted through the respective cross pins 89 to all the remaining gear changing dogs in the off position whilst allowing movement of the selected clutch only.

It is to be understood that the device may be adapted for any number of gear changes and the invention is not confined to the details of construction, the essential feature being a lay shaft gear box with constant mesh gears pre-selectively actuated by the one moving member in a safe and certain manner.

Having now particularly described and ascertained the nature of our said invention and in what manner the same is to be performed, we declare that what we claim is:—

1. Pre-selective change speed gearing comprising in combination constant mesh gears on main and lay shafts adapted to be rendered operable by claw clutches, having inclined teeth, claw clutches slidably mounted on guides parallel to and co-axial with a draw bar, a draw bar interconnected with the clutch pedal so as to be reciprocated thereby, a tappet on the draw bar adapted to engage a member slidably mounted on each dog, a sliding member and a spring on each dog, hand operated means to turn the tappet into engagement selectively with the sliding members, means to positively retain the sliding member in the spring loaded position independently of the tappet and means interconnected with the draw bar to release all the retaining means except that for the selected dog prior to the actuation of the latter and spring means to move the dogs to the inoperative position, substantially as described.

2. Pre-selective change speed gearing comprising in combination constant mesh gears on main and lay shafts adapted to be rendered operable by claw clutches, having inclined teeth, claw clutches slidably mounted on guides parallel to and coaxial with a draw bar, a draw bar interconnected with the clutch pedal so as to be reciprocated thereby, a tappet on the draw bar adapted to engage a member slidably mounted on each dog, a sliding member and a spring on each dog, hand operated means to turn the tappet into engagement selectively with the sliding members, means to positively retain the sliding member in the spring loaded position independently of the tappet and means interconnected with the draw bar to release all the retaining means except that for the selected dog prior to the actuation of the latter and spring means to move the dogs to the inoperative position interlocking means on said dogs automatically actuated by the moving dog to lock the remaining dogs with the clutches in the inoperative position, substantially as described.

3. Pre-selective change speed gearing comprising in combination constant mesh gears on main and lay shafts adapted to be rendered operable by claw clutches, having inclined teeth, claw clutches slidably mounted on guides parallel to and co-axial with a draw bar, a draw bar interconnected with the clutch pedal so as to be reciprocated thereby, a tappet on the draw bar adapted to engage a member slidably mounted on each dog, a sliding member and a spring on each dog, hand operated means to turn the tappet into engagement selectively with the sliding members, latches to retain the sliding member in the spring loaded position independently of the tappet and means interconnected with the draw bar to release all the latches except that for the selected dog prior to the actuation of the latter and spring means to move the dogs to the inoperative position, interlocking means on said dogs automatically actuated by the moving dog to lock the remaining dogs with the clutches in the inoperative position, substantially as described.

4. Pre-selective change speed gearing comprising in combination constant mesh gears on main and lay shafts adapted to be rendered operable by claw clutches, having inclined teeth, claw clutches slidably mounted on guides parallel to and co-axial with a draw bar, a draw bar interconnected with the clutch pedal so as to be reciprocated thereby, a tappet on the draw bar adapted to engage a member slidably mounted on each dog, a sliding member and a spring on each dog, hand operated means to turn the tappet into engagement selectively with the sliding members, latches to positively retain the sliding member in the spring loaded position independently of the tappet and means slidably mounted on the draw bar and interconnected with the clutch pedal to release all the retaining latches except that for the selected dog prior to the actuation of the latter and spring means to move the dogs to the inoperative position, interlocking means on said dogs automatically actuated by the moving dog to lock the remaining dogs with the clutches in the inoperative position, substantially as described.

REGINALD WOOD WHITTLE.
EDWIN TWEMLOW.